(No Model.) 2 Sheets—Sheet 1.
S. H. BARRETT.
AXLE BOX.
No. 350,100. Patented Oct. 5, 1886.
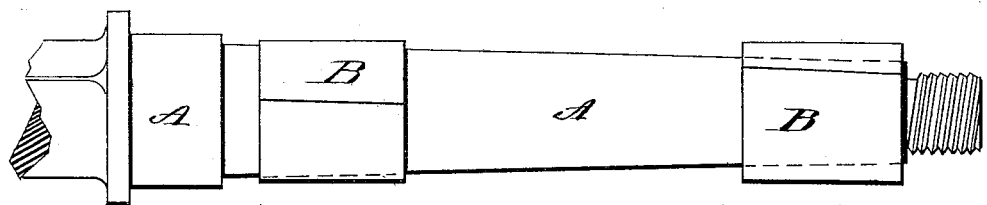
Fig I.
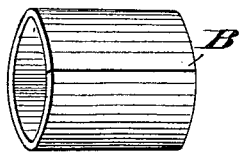
Fig II.
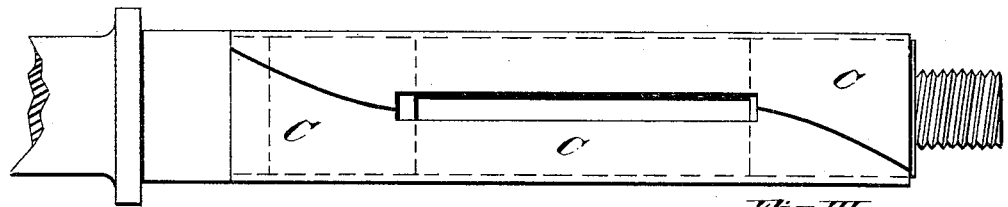
Fig III.
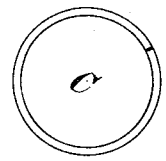
Fig IV.
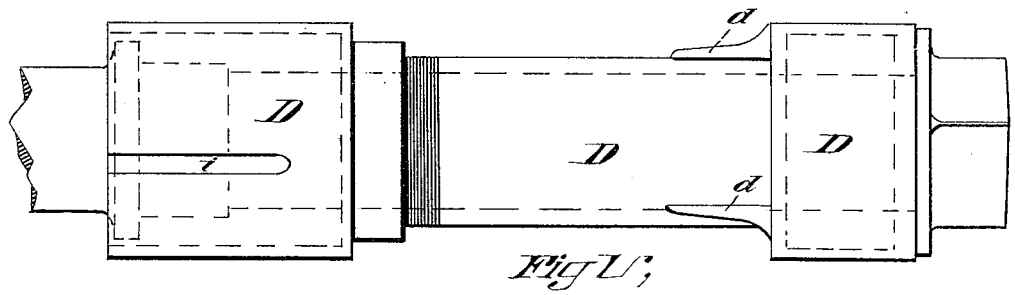
Fig V.
Witnesses,
D. Holland
Timothy M. Brown
Inventor,
S. H. Barrett,
By R. F. Hyde,
Atty.

(No Model.) 2 Sheets—Sheet 2.
S. H. BARRETT.
AXLE BOX.
No. 350,100. Patented Oct. 5, 1886.
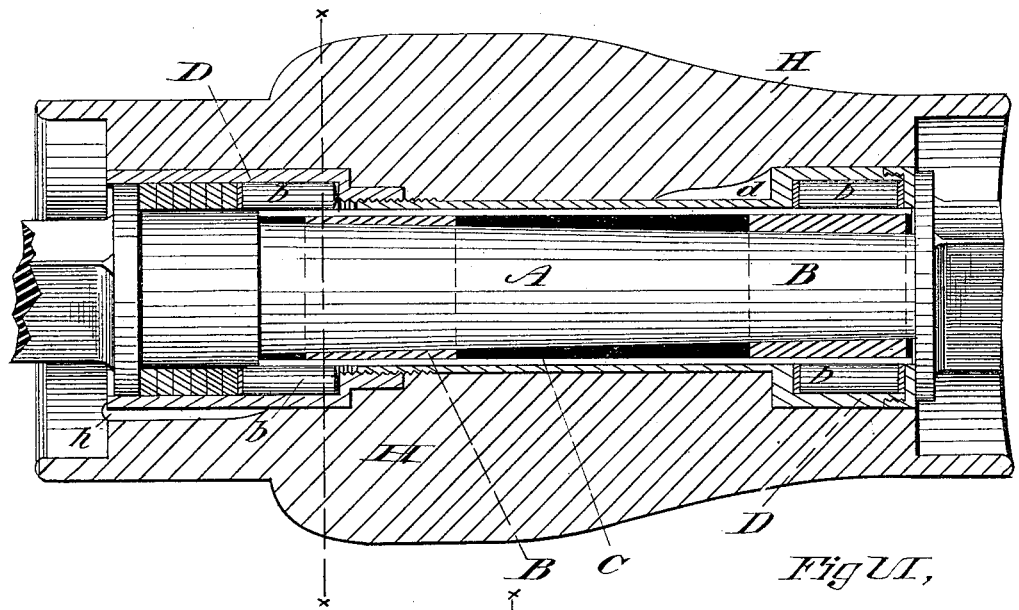
Fig. VI.
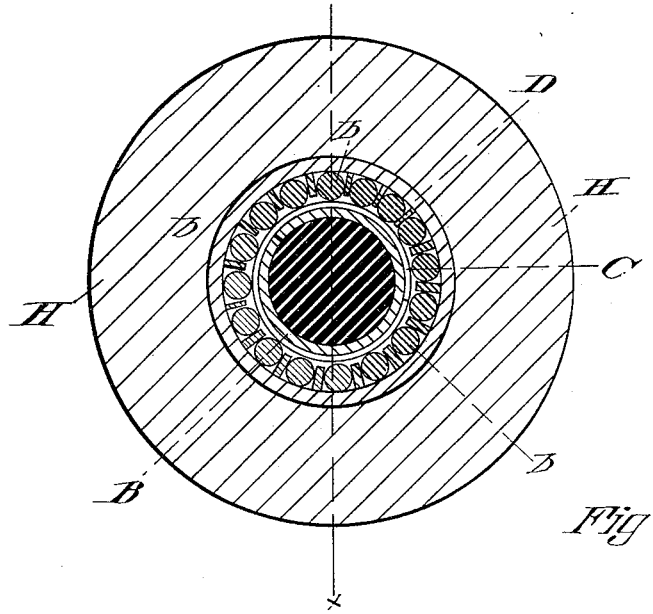
Fig. VII.
Witnesses.
R. Holland
Timothy M. Brown
Inventor;
S. H. Barrett,
By R. F. Hyde
Atty

UNITED STATES PATENT OFFICE.

SIDNEY H. BARRETT, OF SPRINGFIELD, MASSACHUSETTS, ASSIGNOR OF THREE-FOURTHS TO CHARLES E. BARRETT, OF BRATTLEBOROUGH, VERMONT, AND RICHARD T. HAWKINS AND DWIGHT HOLLAND, OF SPRINGFIELD, MASSACHUSETTS.

AXLE-BOX.

SPECIFICATION forming part of Letters Patent No. 350,100, dated October 5, 1886.

Application filed April 29, 1886. Serial No. 200,543. (No model.)

*To all whom it may concern:*

Be it known that I, SIDNEY H. BARRETT, a citizen of the United States, residing at Springfield, Hampden county, State of Massachusetts, have invented certain Improvements in Journals and Journal-Bearings for Wheeled Vehicles, of which the following is a specification.

My improvements relate to the box of a wheel-hub forming the journal-bearings, and to that part of the axle of a vehicle forming the journal within the wheel; and the invention consists in the combination and construction, as hereinafter described, and more particularly pointed out in the claims.

My invention is fully illustrated in the accompanying drawings, in which Figure I is a side view of the end of a vehicle-axle having two thimbles thereon. Fig. II is a perspective view of a thimble. Fig. III is the same as Fig. I, with the addition of a cylindrical sleeve fitted over the thimbles. Fig. IV is an end view of the sleeve. Fig. V is the same as Fig. III, with the addition of the box in place over the sleeve. Fig. VI is a longitudinal section of the hub, box, sleeve, and thimbles in position upon the taper axle; and Fig. VII is a cross-section through the hub and axle upon the dotted line *x x* of Fig. VI.

A is the taper end of an axle, forming the ordinary journal within the ordinary wheel, having a bearing conical to conform thereto.

B B are thimbles, segments of a cone upon their inner surface to conform to the pitch of the axle A, and cylindrical upon their outer surface.

C is a cylindrical sleeve adapted to fit tightly over the thimbles B, and form in effect an integral part of the axle A, the thimbles and sleeve fitting rigidly to the taper axle to convert it into a cylindrical one.

D is the box, adapted to be made fast within the hub H, and having an inner bearing-surface adapted to run easily upon the journal formed by the sleeve C.

The object of my invention is the ready conversion of the taper journal and journal-bearing of a vehicle to a cylindrical one, for the purpose of substituting with small change to the wheel and axle a journal and box having slight friction capable of adjustment relatively to compensate for wear of the journal-surface, and admitting of one or two sizes of box and corresponding sleeve-journal meeting the requirements of all sizes of wheel vehicles in common use.

The difficulty heretofore in applying roller-bearings to vehicles already constructed—*i. e.*, the bearing illustrated in the drawings and forming the subject of United States Patent of January 13, 1885, No. 310,552—has been the difference in the size and taper of the journal of each vehicle, in some cases the difference in the axles of the same vehicle, which, together with the difference in the width of the hubs, rendered it a slow and expensive process reaming out a sleeve to conform internally to the axle and externally to the box to be fitted within the hub, and said sleeve, being soft enough to work to fit the axle, could not be uniformly hardened by tempering; but by using short thimbles, as B, their inner surface may be accurately bored to conform to the limited area of the taper axle upon which they are required to rest, to afford by their outer surface an accurate bearing for the cylindrical sleeve, and the thimbles may be and remain of the softest metal, while combined with these thimbles a sleeve, C, may be used of the hardest steel, to form a journal-surface having many advantages over the axles now in use.

Having a few sizes of thimbles and sleeves to conform to their outer surface, any size axle is soon fitted with the sleeve-journal C, and the box forming the bearing for the corresponding sized sleeve is fitted into the hub. To admit of the box being adjusted to the length of the hub, the box D is formed in two sections, as shown in Figs. V and VI, adapted to screw together, one section being fitted from the front of the hub and driven in the bore therein until the feathers *d* have entered the wood and the end of the box is flush with the face of the hub, and the other section of the box being entered from the rear of the hub and screwed upon the one in place until its rear is flush with the inner face of the hub H, in which position it is kept from turning by a key, h, driven between the groove i of the box and the wood.

When the anti-friction rollers form part of the box, as shown in Figs. VI and VII, I slit the thimbles B, as shown in Figs. I and II, and the sleeve, as seen in Figs. III and IV, by means of which, as the journal-surface of the sleeve C becomes worn to any extent under the rollers b, by driving the thimbles up the taper axle A, the sleeve above them is distended to take up the wear, the diagonal slit in the sleeve C offering no obstacle to the smooth action of the rolls as the sleeve is enlarged. By these means a hardened sleeve-journal and box true thereto may be quickly and cheaply substituted for the worn axles and boxes of greatly varying size in common use, and a roller-bearing may be combined with any vehicle, having the advantage of quick adjustment and easy compensation for all wear upon the journal.

Now, having described my invention, what I claim is—

1. In vehicles, the within described means for converting a taper into a cylindrical axle-journal to conform to the cylindrical box of a hub, and consisting of a cylindrical sleeve conforming outwardly to the box-surface, and a split thimble cylindrical externally, and internally conforming to the cone of the axle-spindle, the two being rigidly combined with the axle-spindle, as shown, by having the thimble forcibly slid over said axle and under the sleeve, as and for the purpose set forth.

2. In wheeled vehicles, a taper axle, A, a thimble, B, cylindrical outwardly and inwardly conforming to the axle, and provided with a longitudinal slit, as shown, to adapt it to be forced upon the axle-cone, a slit cylindrical sleeve, C, held to the axle by said thimble, and adapted to be expanded by the sliding of the thimble thereunder, and a hub, H, provided with a cylindrical bearing adapted to conform to said sleeve, all combined and operating as and for the purpose set forth.

3. The combination and arrangement, substantially as shown, of a taper axle, A, split thimble B, sleeve C, having diagonal slits opposite the rolls b, box D, formed in screw-sections, as shown, anti-friction rolls b, interposed between the box D and sleeve C, and hub H, secured to the box.

SIDNEY H. BARRETT.

Witnesses:
R. F. HYDE,
TIMOTHY M. BROWN.